United States Patent [19]

Hayes et al.

[11] Patent Number: 4,722,741
[45] Date of Patent: Feb. 2, 1988

[54] PRODUCTION OF HIGH METHANE CONTENT PRODUCT BY TWO PHASE ANAEROBIC DIGESTION

[75] Inventors: Thomas D. Hayes, Schaumburg; H. Ronald Isaacson, Clarendon Hills; James R. Frank, Oak Park, all of Ill.

[73] Assignee: Gas Research Institute, Chicago, Ill.

[21] Appl. No.: 710,328

[22] Filed: Mar. 11, 1985

[51] Int. Cl.[4] ............................................. C02F 11/04
[52] U.S. Cl. ................................. 48/197 A; 210/603; 435/167
[58] Field of Search ............. 48/197 A; 210/603, 613; 435/167; 71/10

[56] References Cited

U.S. PATENT DOCUMENTS

| | | | |
|---|---|---|---|
| 3,981,800 | 9/1976 | Ort | 210/603 |
| 4,022,665 | 5/1977 | Ghosh et al. | 435/167 |
| 4,040,953 | 8/1977 | Ort | 48/197 A |
| 4,067,801 | 1/1978 | Ishida et al. | 210/603 |
| 4,315,823 | 2/1982 | Whitt et al. | 210/605 |
| 4,318,993 | 3/1982 | Ghosh et al. | 48/197 A |
| 4,349,435 | 9/1982 | Ochial | 210/96.1 |
| 4,351,729 | 9/1982 | Witt | 210/603 |
| 4,352,738 | 10/1982 | Blay et al. | 210/602 |
| 4,354,936 | 10/1982 | Ishida et al. | 210/602 |
| 4,366,059 | 12/1982 | Witt et al. | 210/615 |
| 4,396,402 | 8/1983 | Ghosh | 48/197 A |

FOREIGN PATENT DOCUMENTS

| | | | |
|---|---|---|---|
| 3307796 | 9/1984 | Fed. Rep. of Germany | 435/167 |
| 136747 | 10/1979 | Japan | 210/603 |
| 88896 | 7/1980 | Japan | 210/603 |
| 51293 | 5/1981 | Japan | 210/603 |
| 73599 | 6/1981 | Japan | 435/167 |
| 74191 | 5/1983 | Japan | 210/603 |

OTHER PUBLICATIONS

Colleran et al., "The Application of the Anaerobic Filter Design to Biogas Production from Solid and Liquid Agricultural Wastes", Institute of Gas Technology, 1982, Proceedings of the Symposium on *Energy from Biomass and Waste.*

Messing, "Immobilized Microbes and a High-Rate, Continuous Anaerobic Waste Processor", Proceedings of the Symposium on *Energy from Biomaass and Wastes,* Institute of Gas Technology, 1982.

Primary Examiner—Barry S. Richman
Assistant Examiner—Joye L. Woodward
Attorney, Agent, or Firm—Thomas W. Speckman

[57] ABSTRACT

An improved anaerobic digestion process is provided to enhance the methane content of product gas so that no further processing may be required for utilization as high quality, high Btu gas comprising greater than 90 percent methane. Operating conditions of lowered carbon dioxide influent concentration to the methane production digester and operation of the methane production digester under pressurization achieve high conversion efficiency rates and high methane content product gas. The carbon dioxide produced during the anaerobic digestion may be physically and chemically separated and removed thereby reducing the carbon dioxide content of the product gas.

26 Claims, 3 Drawing Figures

PRODUCTION OF HIGH METHANE CONTENT PRODUCT BY TWO PHASE ANAEROBIC DIGESTION

BACKGROUND OF THE INVENTION

1. Field of the Invention

This invention relates to improved two phase anaerobic digestion of organic carbonaceous materials wherein a large portion of the carbon dioxide contaminant is removed from the acid forming phase and from the liquid product of the acid forming phase resulting in high methane content product gas recovery from the methane forming phase. The high methane content product gas is further enhanced by carbon dioxide absorption into the liquid phase during the methane forming phase of the anaerobic digestion which is conducted under pressurization.

2. Description of the Prior Art

Anaerobic digestion is a biological process which has been used by industry and municipalities for many years to facilitate sludge stabilization and pollution control efforts. During the anaerobic digestion of organic material, product gas containing mainly methane and carbon dioxide is released. As world energy requirements have increased and as energy resources have become increasingly expensive and unreliable, interest in developing alternative efficient and economically feasible energy resources has heightened. The anaerobic digestion process effects the bioconversion of various kinds of land and water bbiomass and various wastes to product gas containing methane. Anaerobic processes can be used to convert inexpensive, readily available, and inexhaustible resources, notably sludge, industrial and municipal waste and biomass material, to valuable product gases, principally methane. Utilization of such processes is presently limited, largely because expensive and energy-intensive processing is required to convert the raw product gas to a usable gas having a sufficiently high energy value.

The composition of raw product gas generated from single phase anaerobic digesters is typically 55 to 65 percent methane, 35 to 45 percent carbon dioxide, and less than 1 percent hydrogen and hydrogen sulfide. This raw product gas must undergo additional processing to provide gas containing greater than 90 percent methane as preferred for utilization as pipeline quality gas.

Two phase anaerobic digestion processes have been developed in which an acid forming anaerobic digestion is conducted first. In the acid phase, the microbial population and operating conditions are selected to promote the conversion of organic carbonaceous matter to volatile fatty acids of low molecular weight. The volatile fatty acids remain solubilized in the liquid effluent of the first stage, and are conveyed to a second anaerobic digester where a methane producing digestion occurs. In the methane phase, methanogenic microorganisms convert the volatile fatty acids to product gas comprising primarily methane and carbon dioxide. This two phase anaerobic digestion process significantly increases the methane content of the product gas. Product gas released from the second phase may contain up to about 75 percent methane which still requires further processing for utilization as high quality pipeline gas.

Several publications focus on various aspects of the anaerobic digestion process with the objective of increasing the conversion efficiency or the methane content of product gas. U.S. Pat. No. 4,022,665 teaches a two phase anaerobic digestion which utilizes a short retention time of less than two days in the acid forming phase and a longer, 2 to 7 day retention time in the methane producing phase. The U.S. Pat. No. 4,022,665 teaches methanation of carbon dioxide in the methane production phase. A two phase anaerobic digestion system is described in E. Colleran, "The Application of the Anaerobic Filter Design to Biogas Production from Solid and Liquid Agricultural Wastes", Proceedings of the *Symposium on Energy Biomass and Wastes*, Institute of Gas Technology, 1982, wherein limestone chips are used in a packed bed methane phase digester to result in about 90 percent methane content product gas. U.S. Pat. No. 3,981,800 teaches a process wherein combined phase (acid formation and methanogenesis performed in the same digester) anaerobic digestion is conducted under several atmospheres pressure and carbon dioxide is stripped by depressurization resulting in 98 percent methane containing product gas. Two combined phase digesters may be used in series with both acid forming and methanogenic digestion in each. Maintenance of specific volume to interface ratios is taught by U.S. Pat. No. 4,040,953 to allow preferential diffusion of methane while carbon dioxide is retained in the slurry. A photoculture of algae is employed by the process of U.S. Pat. No. 4,354,936 to remove carbon dioxide from the product gas by absorption. U.S. Pat. No. 4,396,402 discloses a method by which organic materials undergo a process of accelerated bioleaching before being introduced as substrate in a two phase anaerobic digestion process. U.S. Pat. No. 4,352,738 teaches a combined phase recycling anaerobic filter for aqueous organic wastes and adjustment of chemical oxygen demand to result in 80 to 90 percent methane; U.S. Pat. No. 4,315,823 teaches a combined phase recycling anaerobic filter for acidic petrochemical wastes operated at relatively high carbon dioxide partial pressure; and U.S. Pat. Nos. 4,351,729, 4,366,059 and 4,349,435, all relate more generally to anaerobic filters for treatment of liquids.

SUMMARY OF THE INVENTION

The process of this invention enhances the methane content of product gas derived from two phase anaerobic digestion of organic solids. The methane content of product gas is enhanced by adjustment of the absorption and desorption of carbon dioxide in the liquid stream passed through the two phase digestion process. The methane content of the product gas is a function of pH and carbon dioxide concentration in the liquid contents of each of the two phase digesters and the rate of substrate conversion to carbon dioxide. As more carbon dioxide is absorbed and solubilized during substrate conversion in the methane forming phase, less appears in the product gas, thus enhancing the methane content in the product gas.

The process of this invention yields high methane content product gas which requires little further processing for use as pipeline quality gas. The process can easily be incorporated into existing anaerobic digestion reactors. One important aspect of the invention is increased separation of carbon dioxide from the liquid phase and its removal as a gas prior to introduction of the liquid product of the acid forming anaerobic digestion phase as an influent to the methane forming anaerobic digestion phase. Another important aspect of the invention is the increase of carbon dioxide absorption into the liquid phase during the methane producing anaerobic digestion reaction conducted under elevated pressure. In addition to removing carbon dioxide from the product gas, the process significantly reduces levels of corrosive hydrogen sulfide in the product gas.

Any organic carbonaceous material which is susceptible to anaerobic biodegradation may be used as feed. The feedstock preferably comprises greater than 15 weight percent total solids. The organic carbonaceous feed is continuously or intermittently introduced into an acid phase digester, where a biologically active mixed microbial population converts the organic substrate to principally fatty acids such as acetic acid, propionic acid and butyric acid. Suitable mixed cultures of microorganisms for acid phase biodigestion are well known in the art. The volatile fatty acid product of the acid phase digestion remains solubilized in the liquid digester contents while carbon dioxide, and small amounts of molecular hydrogen, and methane are released as gaseous products.

In the acid forming phase one objective is to remove substantially all free carbon dioxide as gas from the liquid phase. Free carbon dioxide gas may be removed from the digester headspace by maintaining the digester at atmospheric pressure. Removal of carbon dioxide from the liquid phase may be enhanced by passing a stream of carbon dioxide-free gas through the digester contents. The liquid effluent from the acid forming digester may be passed through an air sparging tank before being introduced into the methane forming digester to further remove carbon dioxide from the liquid effluent. It is desired to reduce the carbon dioxide content of the influent to the methane forming digester to less than about 0.5 gram per liter.

Carbon dioxide gas may be removed from a covered digester by means of a gas release port, or digestion may be conducted in an open vessel releasing the carbon dioxide gas to the atmosphere. The pH in the acid forming digester is naturally depressed to and maintained at about pH 5.0 to pH 6.5 due to the formation of volatile fatty acids. During start up it may be necessary to adjust pH by chemical addition, but upon approaching steady state operation, the pH may be controlled by recycle liquid and rate of withdrawal. The low pH and the low partial pressure of carbon dioxide in the gas phase establishes a large carbon dioxide mass transport driving potential in the liquid phase which converts most of the dissolved carbon dioxide to its gaseous form for removal while favoring volatile fatty acid solubilization in the liquid phase. Under these conditions, the gas withdrawn from the acid forming digester has a carbon dioxide to methane ratio of about 25–50 to 1, making the withdrawn gas suitable for use or sale as carbon dioxide.

Substrate concentration in the acid forming digestion is suitably maintained between about 10 and about 30 grams per liter total organic carbon and preferably less than about 20 grams per liter to promote efficient conversion of organic material and to prevent oversaturation of the liquid phase with $CO_2$ produced by the anaerobic conversion. The total organic carbon concentration in the liquid contents of the acid phase digester may be maintained by dilution through recycle of liquid effluent from the methane forming digester. Efficient conversion of organic substrate to volatile fatty acids and carbon dioxide gas is attained when the solids retention time in the acid forming digester is about 10 to about 30 days.

Liquid effluent from the acid forming digester, enriched in low molecular weight fatty acids, is used as influent to a methane forming digester. Reduction of carbon dioxide content of this influent is important and may be achieved by operation of the acid forming digester under conditions described above and by further purging of the influent to result in less than about 0.5 gram per liter expressed as $CO_2$.

The operating conditions and microbial population in the methane phase digester facilitate the formation of product gas, primarily methane and carbon dioxide, from volatile fatty acids. Suitable methanogenic anaerobes for this purpose are well known. The methane producing digester conditions favor retention of biologically produced carbon dioxide in the liquid phase and release of biologically produced methane as gas, providing high methane content product gas. The substrate concentration is maintained below 20 grams per liter total organic carbon to prevent oversaturation of the liquid phase with carbon dioxide produced. The methane producing digester is maintained at a pH between about 7.5 and about 8.0, thereby increasing the carbon dioxide absorption capacity of the digester liquid. The pH in the methane producing digester is naturally elevated by the biological conversion of volatile acids and may be maintained without addition of chemicals when steady state operating conditions are approached. During start up conditions it may be necessary to adjust the pH to desired initial levels by caustic addition. The gas pressure above the liquid phase of the methane producing digester is maintained at about 15 to about 75 psig, preferably about 20 to about 45 psig. Pressure naturally builds as methane gas is produced, and elevated pressures may be maintained by the placement of a gas regulator in the product gas conduit without requiring separate pressurizing equipment and may be conducted in relatively low pressure vessels. The elevated pressure and high pH inhibits the release of carbon dioxide as gas and retains most of the carbon dioxide formed within the liquid phase. Methane is released as gas because it is virtually insoluble in the aqueous phase at the elevated pressures maintained and at the higher than normally used pH. The methane phase digestion is preferably conducted at ambient temperatures. Hydraulic retention times of less than about 7 days and preferably about 2 to about 5 days result in high methane content product gas.

The process of this invention provides an energy efficient anaerobic biodegradation process to convert organic hydrocarbonaceous material to high methane content gas, over about 90 volume percent methane. The process does not require elevated temperatures, and uses relatively low pressure in only one of the digesters. As a result, process costs remain low, the process requires little or no specialized equipment, and it is adaptable to many different anaerobic digestion systems presently in use. The ease of operation and the high value of the product gas make the process of this invention economically feasible. Carbon dioxide is also recovered in sufficiently pure form to be a saleable byproduct.

It is an object of this invention to provide a process which converts organic solids, by means of anaerobic digestion to high methane content, over 90 volume percent, product gas which is suitable for direct use as high Btu pipeline gas without further processing for carbon dioxide removal.

It is another object of this invention to provide an anaerobic digestion process which achieves separation of carbon dioxide and methane during all phases of the anaerobic digestion process.

It is another object of this invention to provide energy efficient conversion of organic solids to high methane content product gas.

It is still another object of this invention to provide an anaerobic digestion process having internal regulation of the desired pH range and does not require the addition of caustic chemicals.

It is yet another object of this invention to provide an anaerobic digestion process having reduced levels of highly corrosive hydrogen sulfide in the product gas.

It is another object of this invention to provide an economically efficient bioconversion process for production of high methane content product gas which is easily adaptable to anaerobic digestion equipment presently in use.

BRIEF DESCRIPTION OF THE DRAWING

The above objects and other advantages of the invention will become apparent upon reading the following description of preferred embodiments and reference to the drawing wherein.

DESCRIPTION OF THE PREFERRED EMBODIMENTS

Figure 1:
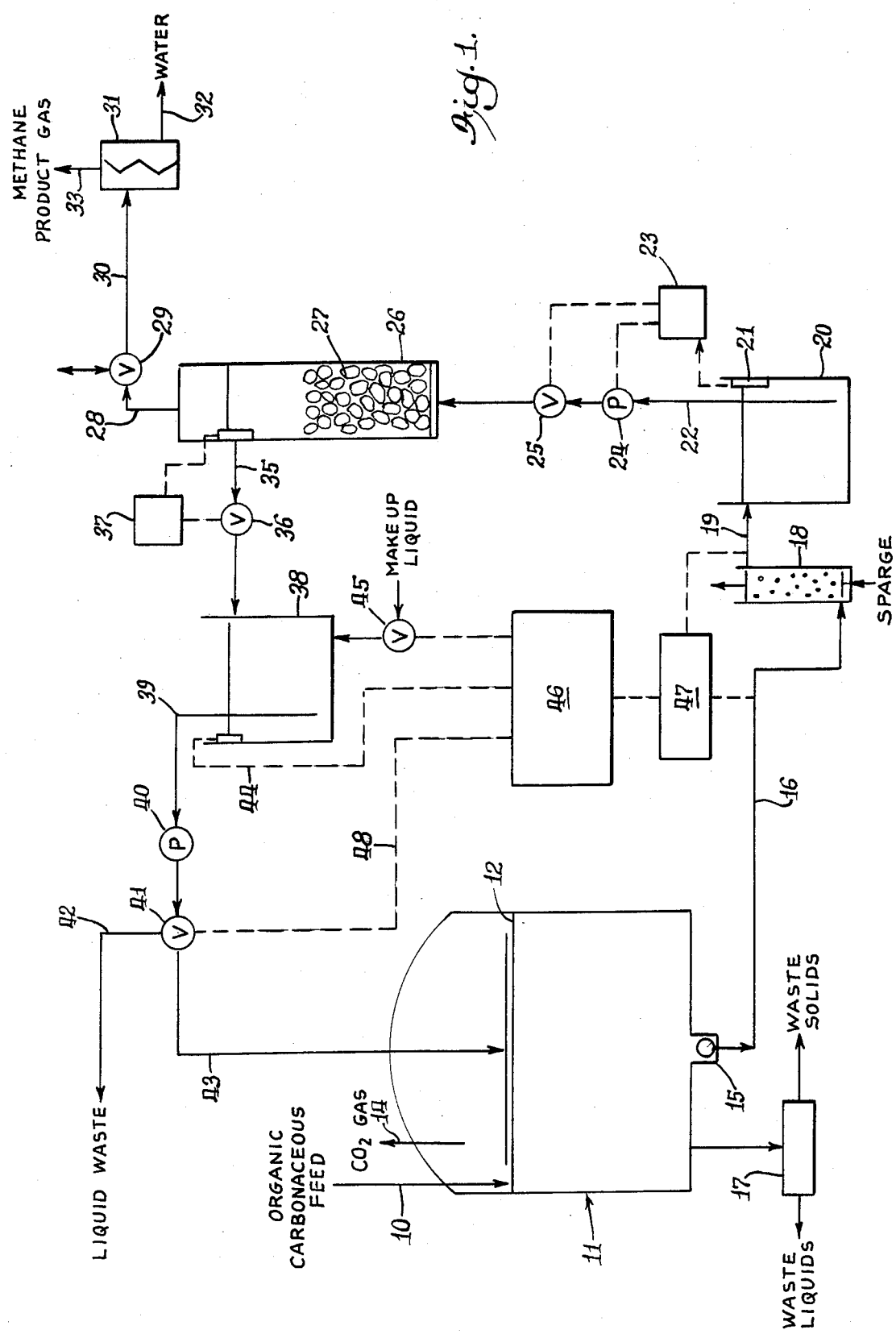
FIG. 1 shows a simplified schematic flow diagram of one embodiment of this invention.

Referring to FIG. 1, any organic carbonaceous material which is susceptible to anaerobic biodegradation, such as crop residue or organic waste, may be used as feed and continuously or intermittently introduced into acid forming anaerobic digester 11 through feed conduit 10. If the feed is in slurry form, the solids can be pumped through conduit 10. In embodiments wherein a leaching bed is used, the feed is fed as solids which are fed into the top of the reactor by commercially available equipment, such as a belt conveyor. The organic carbonaceous feed has a solids content, preferably greater than 15 weight percent total solids. Acid forming anaerobic digester 11 may be any suitable digester known to the art, for example a leaching bed digester. The interface between the liquid phase and the gases in the digester head space is designated in FIG. 1 as 12. Digester 11 may be covered by dome 13 to facilitate carbon dioxide gas recovery through gas recovery conduit 14, or may remain open to the atmosphere to facilitate easy and convenient feeding.

Microorganisms in digester 11 convert the organic feedstock to volatile fatty acids which maintain the pH at about 5.0 to about 6.5. In a leaching bed the volatile acids formed are solubilized and removed in a liquid stream percolated through the leaching bed solids. Effluent from the methane forming reactor may be recycled to the leaching bed for use in percolation.

Digester 11 maintained at atmospheric pressure and a pH of about 5.0 to about 6.5 causes formed carbon dioxide, which is relatively insoluble at this pH range, to separate from the liquid phase and permits high carbon dioxide content gas to be withdrawn through gas recovery conduit 14. The carbon dioxide content of the product gas withdrawn from the acid forming digester is generally greater than 95 volume percent. Volatile fatty acids are highly soluble in this pH range, and remain solubilized in the liquid phase. Removal of the carbon dioxide from the acid forming digester aids in maintenance of the low pH without addition of pH control chemicals. The volatile acid concentration in the leaching bed may be controlled by regulating the flow rate of liquid recycle from the methane forming digester.

Substrate concentration in the acid forming digester 11 is maintained between about 10 to about 30 grams per liter total organic carbon. This volatile acid concentration is maintained by regulating the flow of effluent from the methane forming digester into the reactor. The retention time of organic carbonaceous feed in first stage leaching bed reactor 11 is between about 16 and about 24 days, preferably about 18-22 days.

Undigested waste sludge may be withdrawn from acid forming digester 11 to liquid/solids separator 17, such as a belt press, and the waste liquids utilized for spray irrigation and the waste solids used as fertilizer for land application.

Liquid leachate enriched in volatile fatty acids is withdrawn from acid forming reactor 11 through regulator 15 may be conveyed through leachate removal conduit 16 to sparging tank 18. An air sparging system, or any other suitable stripping means for removal of carbon dioxide, further reduces the concentration of dissolved carbon dioxide in the leachate. The low pH of the leachate favors the rapid release of carbon dioxide upon air sparging. Leachate is suitably retained in an air sparging tank 18 for about 15 to about 25 minutes, preferably about 20 minutes, to achieve about a 75 to 95 percent reduction in residual carbon dioxide in the leachate. Other stripping systems and gases, such as packed towers, may be utilized in the place of air sparging tank 18. The design of suitable systems is described in McCabe and Smith, Unit Operations of Chemical Engineering, McGraw-Hill, (1967).

Sparged leachate, having a carbon dioxide concentration less than about 0.5 gram per liter, preferably less than 0.25 gram per liter, is conveyed through sparged leachate conduit 19 to leachate surge tank 20. Leachate surge tank 20 is equipped with level controller 23 and level control mechanism 21. Leachate is withdrawn from leachate surge tank 20 through conduit 22 by the action of leachate pump 24, the flow of leachate through conduit 22 being regulated by flow control valve 25.

The leachate, enriched in volatile fatty acids and having a low carbon dioxide concentration, is pumped into a methanogenic biologically active methane forming anaerobic digester 26, such as a high rate fixed film digester. High rate fixed film anaerobic digesters are preferred since solid inert particles 27 provide support and fixed growth surfaces for populations of methanogenic bacteria and problems of bacterial washout, which are common with suspended culture anaerobic digesters, are reduced. High rate anaerobic digesters can accommodate high throughputs at hydraulic retention times of less than 7 days, preferably about 2 to about 5 days, as are preferred for use in the process of this invention. Other high rate methanogenic digesters, such as an anaerobic attached film expanded bed, a sludge blanket, or a down flow baffle reactor would also be suitable for use in this process. Substrate concentration in high rate methane forming digester 26 is maintained below about 20 grams per liter total organic carbon by regulating the flow of effluent from the methanogenic digester through the leaching bed.

The pH in methane digester 26 naturally increases to a pH between about 7.5 and 8.0 as volatile acids are converted to product methane gas and carbon dioxide by the action of methanogenic bacteria. The pH within digester 26 need only be regulated by addition of caustic during the initial startup of the system to insure a pH of greater than 7.5. The reactions describing the biological conversion of volatile fatty acids and $CO_2$ and volatile acid equilibria for the methane forming digester at steady state are shown in Table 1. These reactions predict that the net effect of volatile acid conversion and the solubilization of a large fraction of biologically formed $CO_2$ is an elevated pH.

TABLE 1

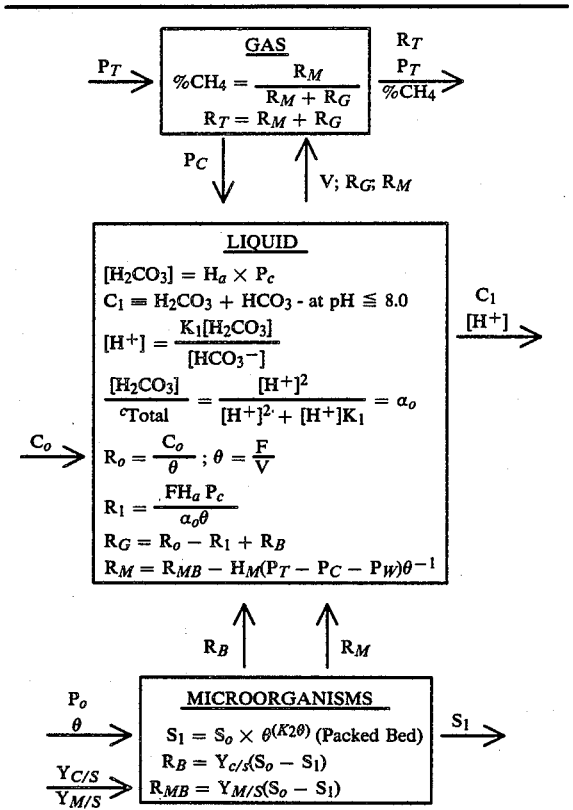

wherein the symbols have the following meanings:

| Symbol | Definition |
|---|---|
| $C_o$ | Influent total $CO_2$ moles/l |
| $C_1$ | Effluent total $CO_2$ moles/l |
| F | Flow of feed, l/day |
| $H_a$ | Henry's law constant for $CO_2$, moles/l-atm |
| $H_m$ | Henry's law constant for $CH_4$, moles/l-atm |
| $K_1$ | First dissociation constant for $CO_2$ |
| $K_2$ | Second dissociation constant for $CO_2$ |
| $\theta$ | Hydraulic retention time, days |
| $R_G$ | Rate of $CO_2$ evolution into gas phase, moles/day |
| $R_o$ | Rate of soluble $CO_2$ entering reactor with influent stream, moles/day |
| $R_1$ | Rate of soluble $CO_2$ leaving reactor with effluent stream, moles/day |
| $R_B$ | Rate of $CO_2$ produced in the biological conversion of organics, moles/day |
| $R_{MB}$ | Rate of $CH_4$ produced in the biological conversion of organics, moles/l |
| $P_T$ | Total gas pressure, atm |
| $P_C$ | Partial pressure of $CO_2$, atm |
| $P_W$ | Vapor pressure of water, atm |
| $S_O$ | Influent substrate concentration, g/l BVS |
| $S_1$ | Effluent substrate concentration, g/l BVS |
| $K_S$ | First order kinetic coefficient, days$^{-1}$ |
| $Y_{C/S}$ | Yield of $CO_2$ in substrate conversion, mole/mole |
| $Y_{M/S}$ | Yield of $CH_4$ in substrate conversion, mole/mole |
| V | Volume of reactor, l |

The pressure in methane forming anaerobic digester 26 is naturally elevated by bacteria capable of producing methane and carbon dioxide against gas pressures in the head space of the methane forming digester. The pressure in methane forming digester 26 is maintained at between about 15 to about 75 psig, preferably about 20 to about 45 psig. These pressures may be maintained by the action of methane formation, but mechanical gas compression may be desired during periods of startup. Digester pressure control valve 29 monitors and regulates the pressure in methane phase digester 26.

Product gas, comprising greater than 90 volume percent methane, preferably greater than 92 volume percent and frequently greater than 95 volume percent methane, may be removed from methane phase digester 26 through product gas conduit 28 regulated by digester pressure control valve 29 to maintain the appropriate pressure level in digester 26. Product gas is conveyed through conduit 30 to condenser 31, where any moisture in the product gas is removed as water through liquid product conduit 32. High methane content product gas is removed from condenser 31 through methane product gas conduit 33 for direct use as high Btu pipeline gas, or any other desired use.

Methane forming digester product liquid is removed, under pressure, from below the liquid surface level of methane phase digester 26. Product liquid, containing solubilized carbon dioxide, is conveyed through product liquid removal conduit 35, with the flow regulated by flow control valve 36 and level controller 37, to methane forming digester product liquid surge tank 38. Liquid may then be removed from surge tank 38 through recycle conduit 39 by pump 40, controlled by flow control valve 41. This liquid may be recycled to acid forming digester 11 through recycle conduit 43 to be used as a percolating liquid stream in the leaching bed for removal of volatile acids. Recycle liquid not needed in acid forming digester 11 may be conveyed through liquid waste conduit 42 for use in land application, or for disposal. Makeup liquid comprising water and nutrients may be added to surge tank 38 through control valve 45.

An optional monitoring and control system which may be incorporated in this process is shown by dotted lines wherein the flow of recycled liquids monitored and regulated at product liquid surge tank 38 or flow control valve 41, represented by lines 44 and 48, respectively. The monitoring system also monitors the pH of the acid forming digester 11, methane forming digester 26, and the total organic carbon content of leachate conveyed through leachate removal conduit 16 by an automatic total organic carbon monitoring means 47, such as is available from I.O. Corporation, College Station, Texas. The monitoring system comprises programmable logic controller which controls rate of recycle flow into acid forming digester 11, adequate air flow for dissolved carbon dioxide removal by removal means 18, rate of influent into methane forming digester 26, and rate of water and nutrient addition to the system. By means of this automatic monitoring and regulating system, the desired total organic carbon and pH levels may be maintained in the digesters without addition of chemicals for pH adjustment as the system approaches steady state operation, as well as maintaining the desired low carbon dioxide content in the influent to the methane phase digester.

The improved process of this invention utilizes the differences in pH and in pressure between acid phase digester 11 and methane phase digester 26 to separate carbon dioxide from methane throughout the process and permit recovery of each of the gases in relatively pure form. In prior anaerobic digestion processes the separation of carbon dioxide and methane has represented up to about one-third the total cost of methane production on a Btu basis. The process of this invention provides these gases in sufficiently pure form for direct use or sale without the requirement of further upgrading. Additionally, the cost of caustic addition for pH control is completely avoided by this process. The use of only moderate pressure in only one digester permits incorporation of the improved process of this invention into many types of existing anaerobic digestion equipment without requiring costly alterations to the existing equipment.

Figure 2:
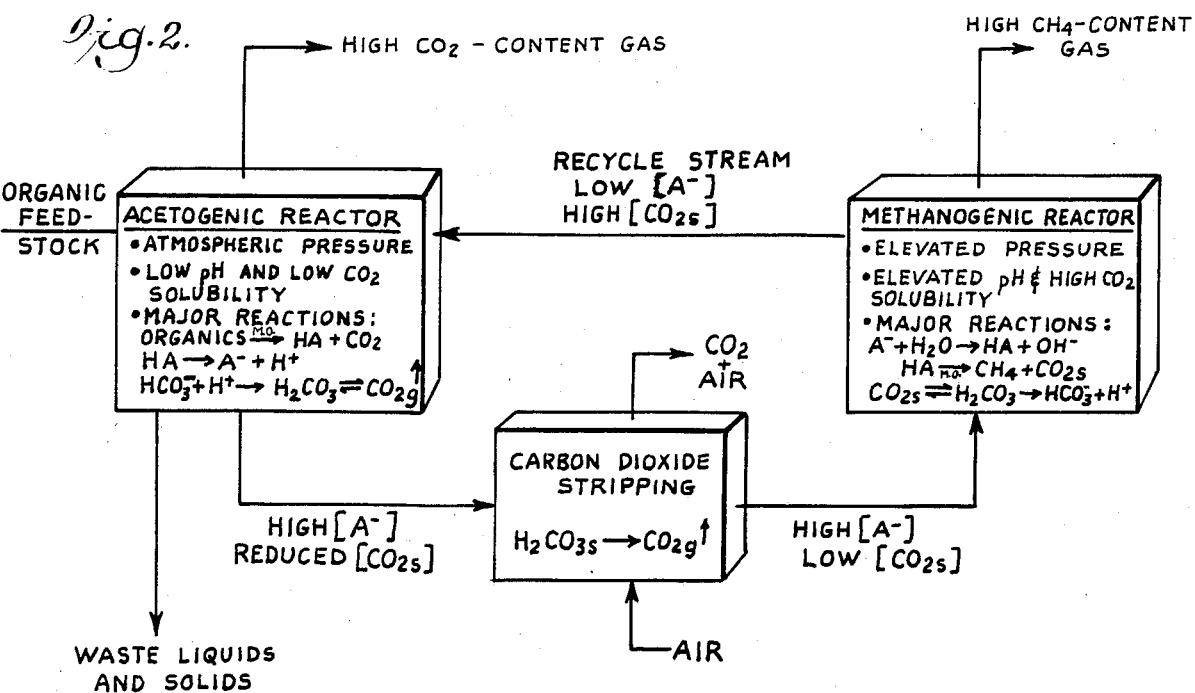
FIG. 2 shows a simplified schematic flow diagram of a generalized embodiment of this invention.

Although the terminology "carbon dioxide" is used in the description and claims with respect to carbon dioxide dissolved in the aqueous liquid phase, it is recognized that in the liquid phase the carbon dioxide exists in the forms $CO_3^= \rightleftharpoons HCO_3^- \rightleftharpoons H_2CO_3$, all of which are included in the terminology "carbon dioxide" and included in the alkalinity expressed as $CO_2$. The distribution of carbon dioxide in the liquid and gas fractions of the anaerobic digester may be described by the equations of the model shown in Table 1. This model was applied in evaluation of the invention under various operating conditions. A schematic summarization of the major equations governing carbon dioxide distribution in the two phase digestion process of this invention is shown in FIG. 2. The mode and process evaluation are described more completely in Hayes, T. D. and H. R. Isaacson, "Bioengineering Concepts for Methane Enrichment in Anaerobic Digestion", Proceedings of 1984 *International Gas Research Conference*, Sept. 12, 1984, currently in print by Government Institutes, Inc., Rockville, Maryland.

Levels of corrosive hydrogen sulfide in the product gas from the methane forming digester are substantially reduced by the process of this invention. The elevated pressure and elevated pH levels used in the methane forming digester achieve greater than 90 percent reduction of hydrogen sulfide in the product gas.

Any suitable anaerobic digester permitting the above described process conditions may be used in the practice of this invention. For example, high rate digesters suitable for the methane forming phase include a packed bed anaerobic filter digester as taught by Colleran 1982, supra; anaerobic attached film digesters as taught by Switzenbaum, M. S., and W. J. Jewell, "Attached-Film Expanded-Bed Reactor Treatment", Journal of the Water Pollution Control Federation, 52(7):1953, (1980); downflow fixed film digesters as taught by Kennedy, K. J. and L. van den Berg, "Use of Fixed Film Reactors for Production of Methane from Waste", *Proceedings of the Third Bioenergy R&D Seminar* sponsored by Energy Project Office National Research Corner of Canada (1981); and upflow sludge blanket digesters as taught by Lettinga, A. F. M., et al, "Use of the Upflow Sludge Blanket (USB) Reactor Concept for Biological Wastewater Treatment, Especially for anaerobic Treatment", *Biotechnology and Bioengineering*, 12:699, (1980).

The following example is set forth in detail to illustrate one preferred embodiment of this invention and should not be considered to limit the invention in any manner.

EXAMPLE

Figure 3:
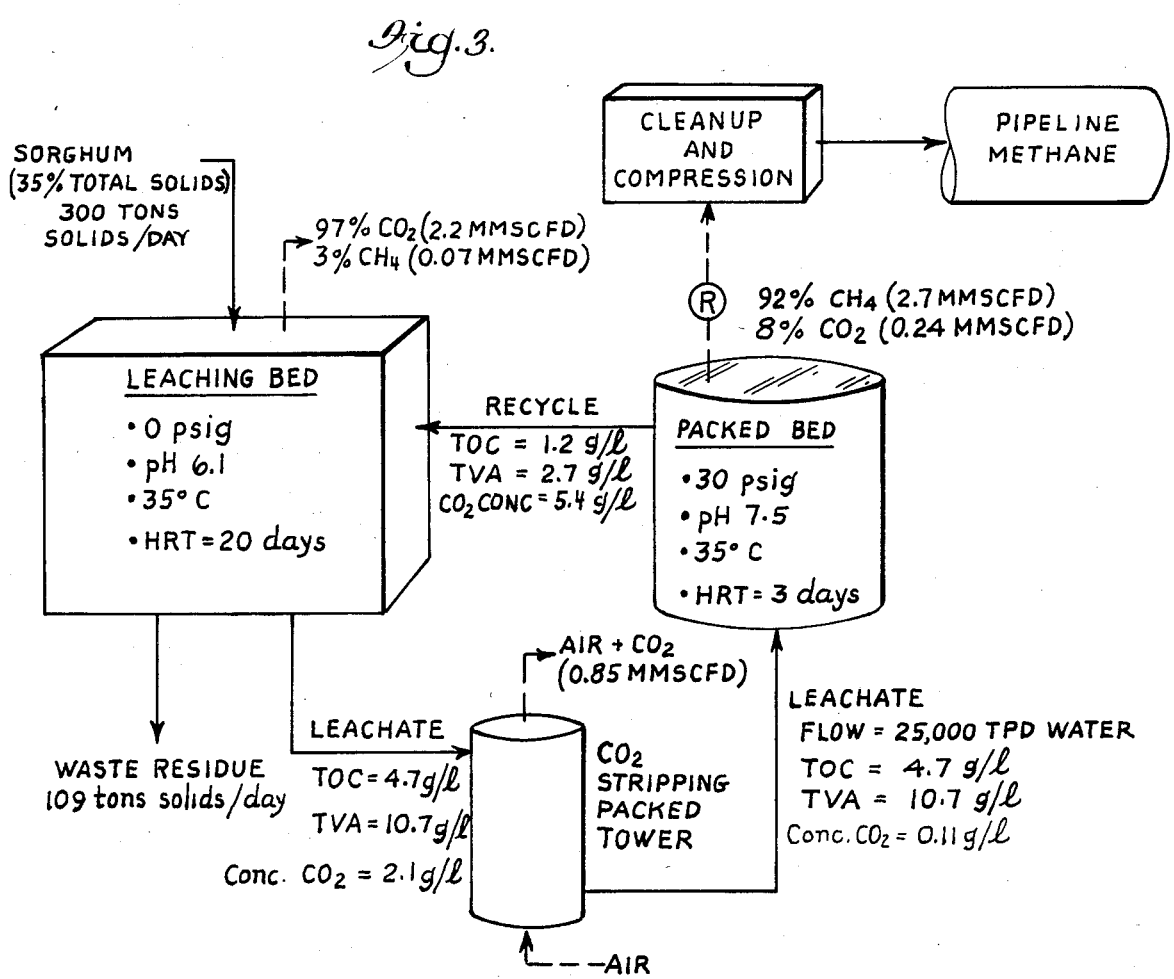
FIG. 3 shows a simplified schematic flow diagram of another embodiment of this invention.

Mass flow calculations for the process of this invention as described above, were made for conversion of sorghum to methane in a two phase anaerobic digestion system wherein the acid forming digester was a leaching bed digester and the methane forming digester was a packed bed digester. Seventy-five percent of the total volatile solids were converted. The sorghum feed was fed to the leaching bed digester in a concentration of 35 weight percent total solids, the volatile solids content being 85 percent of the total soldis. The leaching bed acid phase digester had the head space covered for carbon dioxide collection and was operated at atmospheric pressure and a temperature of 35° C. The pH in the liquid phase of the leaching bed digester was maintained at 6.1 and operated with a mixed acetogenic anaerobic bacteria population for a solids retention time of 20 days. The results of this analysis are shown in the mass flow diagram of FIG. 3 and more fully explained in Hayes and Isaacson, supra. The gas stream removed from the head space of the acid producing digester was 97.0 volume percent carbon dioxide. Waste solids are removed from the acid producing digester and processed through a belt press, liquid waste being used for spray irrigation and residual sludge being used for land application. Liquid leachate product removed from the acid forming digester had 4.7 grams per liter total organic carbon; 10.7 grams per liter total volatile acids as acetic; and a carbon dioxide concentration of 2.1 grams per liter. The leachate was passed through an air stripping tank where 95 percent of the soluble carbon dioxide in the leachate was removed reducing the carbon dioxide content to 0.11 grams per liter. The sparged leachate is passed to a high rate, fixed film packed bed biologically active methane phase anaerobic digester operated at a temperature of 35° C.; pH 7.5; product gas pressure of 30 psig; and with a hydraulic retention time of 3 days, to result in a product gas having 92 volume percent methane content. The liquid effluent of the methane phase anaerobic digester was recycled to the acid forming phase digester to control the total organic carbon content in the acid forming digester.

The high methane content product gas was achieved without addition of any chemicals to the process for pH control and under low pressure and near ambient temperatures, resulting in an efficient, low energy consumption process.

The computer model used for the calculations (Table 1) in the Example was run on ten different digester runs selected from the literature (Table 2) having a wide range of methane phase digestion conditions of influent substrate concentrations (7 to 112 grams per liter), influent alkalinities (0.4 to 13.4 grams per liter as $CaCO_3$), influent and effluent pH (6.5 to 7.8), and hydraulic retention times (1–30 days). The correlation coefficient was found to be $R^2=0.98$ for the actual methane content results reported in the literature. This high correlation shows the validity of the computer model over a wide range of digester designs and operating conditions.

TABLE 2

| Ref. | Feed | $P_T$ (atm) | $T_2$ (°C.) | $S_0$ (g/l) | $S_1$ (g/l) | $\theta$ (days) | Influent $CO_2$ Alkalinity (gms/l as $CaCO_3$) | Influent $CO_2$ (gm/l) | Infl. pH | Effl. pH | Methane Content of the Product Gas % Reported | Predicted by Model |
|---|---|---|---|---|---|---|---|---|---|---|---|---|
| 1 | Cattle Manure | 1.0 | 61 | 35.2 | 28.4 | 5.0 | 2.554 | 1.27 | 7.1 | 6.8 | 51 | 53.3 |
| 1 | Cattle Manure | 1.0 | 35 | 74.6 | 41.4 | 30 | 8.660 | 3.89 | 7.77 | 7.3 | 54 | 56.2 |
| 2 | Cattle Manure | 1.0 | 35 | 57.5 | 37.5 | 10 | 1.55 | 0.82 | 6.88 | 7.15 | 55 | 59.9 |
| 3 | Cattle Manure | 1.0 | 35 | 103.6 | 70.8 | 30 | 13.43 | 8.26 | 6.6 | 7.7 | 58 | 60.4 |
| 3 | Cattle Manure | 1.0 | 35 | 112.1 | 80.9 | 15 | 12.02 | 7.39 | 6.6 | 7.7 | 55 | 61.4 |
| 1 | Cattle Manure | 1.0 | 60 | 35.2 | 27.7 | 10 | 2.796 | 1.26 | 7.7 | 7.3 | 61 | 61.9 |
| 4 | Cattle Manure | 1.0 | 32 | 24 | 16 | 10 | 1.58 | 0.80 | 7.0 | 6.9 | 62 | 62.2 |
| 5 | Cattle Manure | 1.0 | 32.5 | 19 | 6.4 | 10 | 3.76 | 1.82 | 7.2 | 7.2 | 58 | 62.4 |
| 6 | Hyacinth + sludge + MSW | 1.0 | 35 | 3.22 | 1.22 | 2.3 | 0.470 | 0.85 | 5.71 | 6.88 | 73.0 | 72.2 |
| 7 | Cattle Manure | 1.0 | 35 | 19.2 | 10.5 | 12 | 0.650 | 0.30 | 7.5 | 7.43 | 77 | 76.9 |
| 8 | Grass | 1.0 | 30 | 10.15 | 2.6 | 3.0 | 0.400 | 0.26 | 6.5 | 7.85 | 90 | 89.9 |

| Ref. No. | Reference |
|---|---|
| 1 | Jewell, W. J., et al, "Anaerobic Fermentation of Animal Residue: Potential for Improvement and Implementation", U.S. Department of Energy Report No. EY76SO229817, available through the National Technical Information Service, Springfield, VA, (1978) |
| 2 | Boone, D. R., "terminal Reactions in the Anaerobic Digestion of Animal Waste", Applied and Environmental Microbiology, 43(1):57, (1982) |
| 3 | Jewell, W. J., et al, "Anaerobic Fermentation of Agricultural Residue", U.S. Department of Energy Report No. DOE/ET/20051-T2, available through the National Technical Information Service, Springfield, VA, (1980) |
| 4 | Fong, W., "Methane Production from Animal Wastes by Anaerobic Digestion", M. Sc. Thesis, University of Manitoba, (1973), data reported in Shaddock and Moore; The Anaerobic Digestion of Livestock Wastes to Product Methane, by G. Shadduck and J. A. Moore, Agricultural Engineering Dept., University of Minnesota, St. Paul, MN, (1976) |
| 5 | Gramms, L. L., L. B. Polkowski and S. A. Witzel, "Anaerobic Digestion of Farm Animal Wastes", Trans. Am. Soc. Agr. Eng., 14(1):7, (1971), data reported in Shadduck and Moore, supra |
| 6 | Ghosh, S. V., and M. P. Henry, "Application of Packed-Bed Upflow Towers in Two-Phase Anaerobic Digestion", Proceedings of the First International Conference on Fixed-Film Biological Processes, Kings Island, Ohio, p 1392 (1982), Sponsored by the U.S. E.P.A. |
| 7 | Dalrymple, W. and D. E. Proctor, "Feasibility of Dairy Manure Stabilization by Anaerobic Digestion", Water and Sewage Works, 114(9):361, (1967), data reported in Shadduck and Moore |
| 8 | Colleran, E., "The Application of the Anaerobic Filter Design to Biogas Production from Solid and Liquid Agricultural Wastes", Proceedings of the Symposium on Energy from Biomass and Wastes, Institute of Gas Technology, (1982) |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a process for production of high methane content product gas by two phase anaerobic digestion of organic carbonaceous materials wherein a first acid producing phase converts said organic carbonaceous materials to form a liquid composition of predominantly low molecular weight acids used as an influent substrate to a second methane producing phase which converts said influent substrate to form said product gas comprising predominantly methane, the improvement comprising: maintaining said first acid producing phase at substantially atmospheric pressure and desorbing substantially all free carbon dioxide as gas from said liquid composition in said first acid producing phase, thereby substantially reducing the carbon dioxide content of said influent substrate to said second methane producing phase; and pressurizing said second methane producing phase.

2. The process of claim 1 wherein said carbon dioxide content of said influent substrate is further reduced by purging with air prior to introduction of said influent substrate to said second methane producing phase.

3. The process of claim 2 wherein said carbon dioxide content of said influent substrate is reduced to less than about 0.5 gram per liter.

4. The process of claim 1 wherein said methane producing phase is conducted under a product gas pressure of about 15 to about 75 psig.

5. The process of claim 4 wherein said organic carbonaceous materials are at a concentration below about 20 grams per liter total organic carbon in said first acid producing phase.

6. The process of claim 4 wherein said influent substrate is retained in said methane producing phase for a hydraulic retention time of less than about 5 days; said influent substrate in said methane producing phase has a pH of about 7.5 to about 8.0; and said product gas comprises more than about 90 volume percent methane.

7. The process of claim 6 wherein said pH of about 7.5 to 8.0 is maintained under generally steady state conditions by biological conversion of said low molecular weight acids in said influent substrate of said methane producing phase to carbon dioxide and methane.

8. The process of claim 7 wherein a liquid effluent is withdrawn from said methane producing phase and recycled to said acid producing phase; and carbon dioxide is removed from said liquid effluent prior to its introduction to said acid producing phase.

9. The process of claim 1 wherein said organic carbonaceous materials are at a concentration below about 20 grams per liter total organic carbon in said first acid producing phase.

10. The process of claim 1 wherein said influent substrate in said methane producing phase has a pH of about 7.5 to 8.0 which is maintained under generally steady state conditions by absorption of carbon dioxide in said influent substrate of said methane producing phase.

11. The process of claim 1 wherein a liquid effluent is withdrawn from said methane producing phase and recycled to said acid producing phase; and carbon dioxide is desorbed from said liquid effluent prior to its introduction to said acid producing phase.

12. The process of claim 1 wherein said liquid composition in said acid producing phase has a pH of about 5.0 to about 6.5.

13. The process of claim 1 wherein said first acid producing phase comprises a leaching bed digester.

14. A process for production of high methane content product gas comprising:
feeding organic carbonaceous material to a biologically active anaerobic acid producing digester;
anaerobically digesting said organic carbonaceous material in said acid producing digester to produce a liquid composition comprising predominately low molecular weight organic acids and a gaseous composition comprising predominately carbon dioxide, said gaseous composition being removed from said acid producing digester to maintain a gas pressure in said acid producing digester at about atmospheric, while maintaining a pH of said liquid composition in said acid producing digester at about 5.0 to about 6.5 through production of said acids, thereby desorbing substantially all free carbon dioxide as gas from said acid producing digester liquid composition;
transferring said acid producing digester liquid composition to a biologically active anaerobic methane producing digester, said transferring including further reducing the carbon dioxide content of said acid procuding digester liquid composition prior to introduction to said methane producing digester;
anaerobically digesting said low molecular weight organic acids under an elevated digester pressure in said methane producing digester to produce a high methane content product gas, removing said high methane content product gas from said methane producing digester, and maintaining said liquid composition in said methane producing digester at a pH of about 7.5 to about 8.0.

15. The process of claim 14 wherein said further reducing said carbon dioxide content of said acid producing digester liquid product is performed by purging by air.

16. The process of claim 15 wherein said carbon dioxide content of said acid producing digester liquid composition is reduced to less than about 0.5 gram per liter.

17. The process of claim 14 wherein said methane producing digester is maintained at a product gas pressure of about 15 to about 75 psig.

18. The process of claim 17 wherein said liquid composition is maintained at a concentration below about 20 grams per liter total organic carbon in said methane producing digester.

19. The process of claim 17 wherein said liquid composition is retained in said methane producing digester for a hydraulic retention time of less than about 5 days and said product gas comprises more than about 90 volume percent methane.

20. The process of claim 19 wherein said pH of about 7.5 to 8.0 is maintained in said liquid composition of said methane producing digester under generaly steady state conditions by biological conversion of said low molecular weight organic acids to methane and carbon dioxide.

21. The process of claim 20 wherein a liquid effluent is withdrawn from said methane producing digester and recycled to said acid producing digester; and carbon dioxide is removed from said liquid effluent prior to introduction to said acid producing digester.

22. The process of claim 20 wherein said organic carbonaceous material is maintained at a concentration of greater than about 15 weight percent total solids in said acid producing digester; said liquid composition of said acid producing digester has a total soluble organic carbon concentration of less than about 20 grams per liter; and said organic carbonaceous materials are retained in said acid producing digester for a retention time of about 10 to about 30 days.

23. The process of claim 14 wherein said liquid composition in said methane producing digester is at a concentration of below about 20 grams per liter total organic carbon.

24. The process of claim 14, wherein said pH of about 7.5 to 8.0 is maintained in said liquid composition of said methane producing digester under generally steady state conditions by biological conversion of said low molecular weight organic acids to methane and carbon dioxide.

25. The process of claim 14 wherein a liquid effluent is withdrawn from said methane producing digester and recycled to said acid producing digester; and carbon dioxide is removed from said liquid effluent prior to it introduction to said acid producing digester.

26. The process of claim 14 wherein said first acid producing phase comprises a leaching bed digester.

* * * * *